United States Patent Office 2,954,611
Patented Oct. 4, 1960

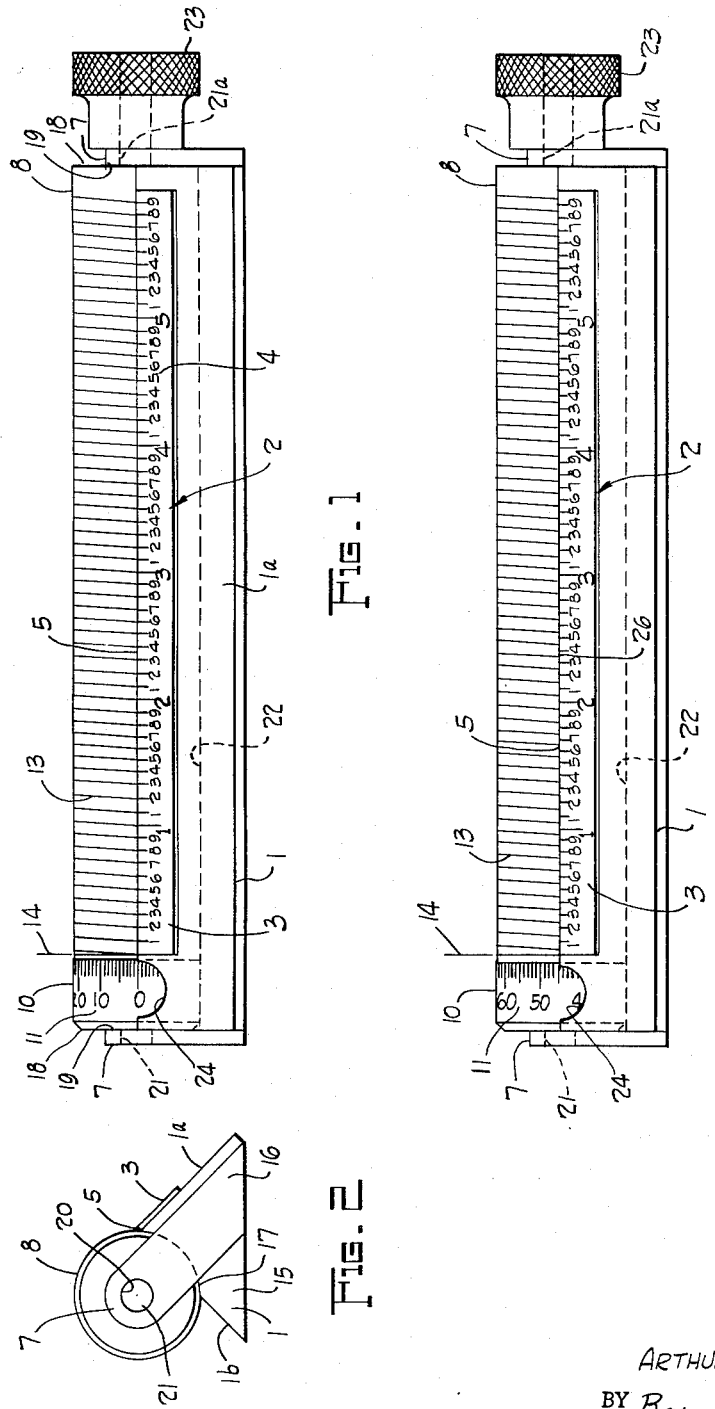

2,954,611

DEVICE FOR SETTING CALIPERS AND THE LIKE

Arthur Edward Wiskoff, Garfield Heights, Ohio, assignor to Trico Machine Products Corporation, Cleveland, Ohio, a corporation of Ohio Filed Sept. 3, 1957, Ser. No. 681,707

7 Claims. (Cl. 33—125)

This invention relates to devices for accurately setting calipers, dividers and similar instruments for use in laying out drawings for dies and the like and in other work demanding extreme accuracy.

It is a general object of my invention to provide an improved device for accurately setting calipers, dividers and similar instruments, hereinafter called calipers. Further objects of my invention include the provision of a device for setting calipers which has the accuracy of a micrometer scale; which is easily and readily used for quickly, positively and accurately setting the calipers which is simple and foolproof in structure and use, and relatively economically manufactured; which does not inherently induce inaccuracies in caliper settings made thereon, and which is so constructed and has its parts so related as to substantially eliminate any tendency to induce inaccuracies in settings made thereon as a result of the use of the device and consequent wear between the parts thereof.

Other objects of my invention include the provision of a device or scale for setting calipers which permits the calipers to be set exactly and accurately to one thousandth (.001) of an inch, which has only one moving part, and which has no parts having relative or actual longitudinal movement or movement in the direction of relative movement, while being set or positioned, of the respective parts of the calipers.

These and other objects and advantages of my invention will appear from the following description of a preferred embodiment thereof, reference being made to the drawings in which:

Figure 1 is an elevation of a caliper setting device embodying the preferred form of my invention;

Figure 2 is an end view of the device shown in Figure 1; and

Figure 3 is an elevation of the device shown in Figure 1 showing the same as it appears, for example, when in use for setting a pair of calipers at 2.345 inches.

In the past numerous devices, instruments and arrangements have been suggested for facilitating and expediting the accurate setting of calipers for use in those instances, such as the preparation of drawings for dies and the like, where extreme accuracy is required. Such caliper setting devices have, in general, proven unsatisfactory, especially for the highly accurate work required by today's production methods, either because the scales thereon did not have the necessary minute indicia and the devices were inherently incapable of having the same or because the devices had parts movable relative to each other and necessary for the proper use thereof, which, by their very structure and mode of operation, introduced inaccuracies, per se, into any caliper settings which were made thereon, or which had structure such that resultant wear between the moving parts, due to the use thereof, occurred was concentrated at, and was brought about by the use of the device's vernier adjustment. In the latter instance the very use and fine adjustment of the device tended to increase the wear between the parts thereof and to be directly reflected in the consequent inaccuracy of the vernier adjustment and errors in the caliper settings made thereon.

Broadly my invention comprises a plurality of scales, one longitudinal, one cylindrical and one helical. The longitudinal scale is fixed and the cylindrical and helical scales are disposed adjacent the longitudinal scale and are mounted so as to be fixed relative to each other and fixed longitudinally relative to the longitudinal scale but are rotatable relative to the longitudinal scale about an axis parallel therewith. In use the cylindrical and helical scales are rotated until the desired setting as indicated by the cylindrical scale is obtained and then the calipers are exactly and accurately set by placing one leg thereof at the zero or base mark of the cylindrical scale at the zero of the longitudinal scale and the other leg on the helical scale at the proper predetermined intersection between the helical scale and the longitudinal scale.

More particularly a device embodying my invention comprises a base member having a fixed longitudinally extending scale thereon and a cylindrical member, having cylindrical and helical scales thereon, and supported on the base member and extending longitudinally along said longitudinal scale with the helical scale adjacent thereto. Further the scales are preferably so arranged that the longitudinal scale includes an edge, having indicia adjacent the helical scale, the base or zero setting of the cylindrical scale aligns with the said edge of the longitudinal scale and the helical scale aligns with the indicia of the longitudinal scale when the cylindrical scale is at zero.

As shown in Figures 1 and 2 a device embodying my invention preferably includes a longitudinally extending conveniently substantially triangularly shaped base member 1, having front and rear faces 1a and 1b, respectively, and a longitudinally extending scale 2 on face 1a adjacent the apex of the triangle. I preferably provide the scale 2 by securing a flat longitudinally extending member 3, which has indicia 4 along the upper or exposed edge 5 thereof to the face 1a at the upper edge thereof. Support arms 7 are secured to the respective ends of the base member and in turn rotatably support a cylindrical member 8. The cylindrical member 8, which is conveniently formed from cold rolled steel or other suitable material, is provided (leftward as viewed) with a cylindrical scale 10, having indicia 11, preferably at one end thereof, and along its length with a helical scale 13. Helical scale 13 preferably has a pitch equal to the distance between the nearest of the indicia marks 4 on the scale 2 and cylindrical scale 10 divides the circumference of member 8 into a plurality of equal segments. The member 8 is also preferably provided with a base line 14, which lies in a plane perpendicular to the axis of the member 8 and is longitudinally aligned with the zero or base mark indicia of the scale 2.

Preferably and for example, the scale 2 is divided into 10ths of an inch, as indicated; the helical scale 13 has a pitch of 1/10 of an inch, i.e., each revolution of the helical scale advances the line longitudinal 1/10 of an inch along the cylindrical member 8, and the cylindrical scale 10 is divided into 100 equal parts (although other divisions and indicia may be used if desired). The scales are also preferably so arranged that when the zero or base mark of the cylindrical scale is longitudinally and rotationally aligned with and lies along the top edge 5 of scale 2 the helical scale 13 is aligned with the respective indicia of the longitudinal scale, as shown in Figure 1.

Even more particularly and in order that the scales may be juxtaposed in their preferred relationship, while maintaining the stability of the device and the compactness thereof, I prefer that the arms 7 be disposed in slots provided in the ends 15 of the base member 1 so that the outer faces 16 of the arms 7 are flush with the respective ends of the base member. I also prefer that the rear face 16 of base 1, see Figure 2, be provided with a longitudinally extending groove 18 of sufficient radius to receive a portion of the cylindrical member 8 so that the line of intersection between the cylindrical member 8 and the scale 2 lies substantially along the apex of the base 1 to the end that pressure exerted on the device when the calipers are being positioned exerts a downward force through the apex of the device and therefore does tend to tip the same. The edge 5 of member 3 is preferably positioned as close to the member 8 as is practicable without engaging the same and interfering with the rotation thereof.

In order to preclude relative longitudinal movement between the member 8, and therefore the scales 10 and 13, and the scale 2, I preferably provide shoulders 18 at both ends of the member 8 and make the distance therebetween equal to the distance between the inner faces 19, Figure 1, of the support arms 7 and provide apertures 20, Figure 2, in the support arms 7, which receive the necked or stub end portions 21 and 21a, respectively, of the cylindrical member 8. Thus the normal wear between the relatively movable base (support arms) and cylinder consequent upon the use of the device occurs between the portions 21 and 21a of the member 8 and that part of the support arms 7 which forms the circumference of and bounds the apertures 20 and such wear does not effect the relative longitudinal position of the helical and longitudinal scales which is necessary to the accurate functioning of the device and the accuracy of the calipers settings made through the use thereof and which as shown above is determined by the shoulders 18 of the member 8 abutting the inner faces 19 of the respective support arms 7.

In order to facilitate rotating the member 8 relative to the scale 2, one end thereof, 21a for example, is preferably extended outwardly beyond the support 7, rightwardly as viewed, and a conveniently knurled knob 23 is mounted thereon. I also preferably notch the front face 1a of the base 1 adjacent the scale 2, as at 24, so as to more clearly expose to view the indicia of scale 10 so that the cylindrical scale may be set more accurately.

In use and if it is desired, for example, to set the calipers at 2.345 inches, the cylinder 8 is rotated by means of knob 23 until the 45 mark of scale 10 is aligned with the edge 5 scale 2, see Figure 3. One arm of the caliper is then set on the base line 14 adjacent the zero point of the scale 2 and the other end of the caliper is set on the helical scale 13 where the same first intersects the scale 2 after the 2.3 inch mark, indicated at 26 on Figure 3. The calipers are then set for exactly 2.345 inches since the fact that the scale 13 is helical causes the scale 13 to intersect the scale 2 at 0.045 inch to the rightward of the whole indicia mark of the scale 2 when the cylinder 5 is rotated downwardly, rightwardly as viewed in Figure 2, through 45/100 of a complete turn. Setting to ten thousands of an inch may be made by estimating the position of the cylindrical scale 10 relative to the edge 5 of the longitudinal scale 2 between the adjacent indicia marks of the cylindrical scale.

Modifications, changes and improvements to the preferred form of my invention herein described may occur to those skilled in the art, who come to understand the precepts and principles of my invention. Accordingly, I do not wish to be limited in the scope of my patent to the form of my invention herein particularly illustrated and described but only in a manner consistent with the advance by which my invention has promoted the art.

I claim:

1. A device for setting calipers, dividers and the like comprising a longitudinally extending generally triangularly shaped base member having front and rear faces, respectively, and ends, a flat longitudinally extending member secured to said front face, said member having an edge extending along the apex of said base and having indicia along said edge including a base mark and forming a longitudinal scale, a cylindrical member, support arms having inner and outer faces carried by the respective ends of said base and having apertures for receiving and rotatably supporting said cylindrical member, said cylindrical member having shoulders respectively engaging said inner faces of said support members and necked portions at is respective ends, said necked portions of said cylindrical member being disposed in said apertures of said support members respectively, one said necked portion of said cylindrical member extending beyond the respective said support member and having a knob thereon for turning said cylindrical member, said cylindrical member being supported immediately adjacent said flat member and rotatable relative to said flat member without engagement therewith, a base line on said cylindrical member, said base line lying in a plane perpendicular to the axis thereof and being longitudinally aligned with said base mark of said longitudinal scale, a helical scale on said cylindrical member and juxtaposed to said longitudinal scale and of pitch equal to the distance between adjacent indicia on said longitudinal scale, a cylindrical scale on said cylindrical member and dividing said member into a predetermined number of equal arcuate segments and having a zero mark adapted to be aligned with said edge of said longitudinal scale, said helical scale being in alignment with the indicia of said longitudinal scale when said zero mark of said cylindrical scale is aligned with said edge of said longitudinal scale, a longitudinally extending groove in said rear face of said base, an arcuate portion of said cylindrical member being disposed within said groove and slots within said ends of said base member to receive said support members respectively, so that the outer faces thereof lie flush with the ends of said base member.

2. A device for setting calipers, dividers and the like comprising a longitudinally extending generally triangularly shaped base member having a front face, a longitudinally extending flat member secured to said front face, said flat member having an edge extending adjacent the apex of said base and having indicia along said edge including a base mark and forming a longitudinal scale, a cylindrical member, longitudinally spaced support arms carried by said base and having inner faces and apertures, said apertures receiving a portion of and rotatably supporting said cylindrical member immediately adjacent said flat member and rotatable relative to said flat member without engagement therewith, said cylindrical member extending parallel with said flat member and having shoulders respectively laterally engaging the inner faces of said support members to prevent longitudinal movement of said cylindrical member, a base line on said cylindrical member and lying in a plane perpendicular to the axis thereof and being longitudinally aligned with said base mark of said longitudinal scale, a helical scale on said cylindrical member and juxtaposed to said longitudinal scale and of pitch equal to the distance between equally spaced indicia on said longitudinal scale, a cylindrical scale on said cylindrical member and dividing said member into a predetermined number of equal arcuate segments and having a zero mark adapted to be aligned with said edge of said longitudinal scale, said helical scale being in alignment with respective indicia of said longitudinal scale when said cylindrical scale zero mark is aligned with said edge of said longitudinal scale.

3. A device for setting calipers, dividers and the like comprising a longitudinally extending generally triangularly shaped base member having front and rear faces and ends, a flat longitudinally extending member secured to said front face, said flat member having an edge extending along the apex of said base and having indicia along said edge including a base mark and forming a longitudinal scale, a cylindrical member rotatably supported on said base and parallel with said flat member, a base line on said cylindrical member and lying in a plane perpendicular to the axis thereof and being longitudinally aligned with said base mark of said longitudinal scale, a helical scale on said cylindrical member, intersecting said base line and juxtaposed to said longitudinal scale and of pitch equal to the distance between equally spaced indicia on said longitudinal scale, a cylindrical scale on said cylindrical member and dividing said member into a predetermined number of equal arcuate segments and having a base mark adapted to align with said edge of said flat member, said helical scale aligning with the indicia of said longitudinal scale when said base mark of said cylindrical scale is aligned with said edge of said flat member, a longitudinally extending groove in said rear face of said base and an arcuate portion of said cylindrical member being disposed in said groove.

4. A device for setting calipers, dividers and the like comprising a base, a cylindrical member having an axis and supported on said base for rotation about said axis, a helical scale on said cylindrical member and extending parallel with said axis, a cylindrical scale on said cylindrical member for measuring the angle through which said cylindrical member is rotated and having indicia and a base mark for determining a zero setting, said base having a longitudinally extending scale disposed along a longitudinally extending line juxtaposed to and parallel with said cylindrical member, said longitudinally extending scale including a base mark and equally spaced indicia, said helical scale having a pitch equal to the distance between said equally spaced indicia on said longitudinal scale and aligning with said equally spaced indicia of said longitudinal scale when said cylindrical scale is set at zero.

5. The caliper setting device according to claim 4 in which said base mark of said cylindrical scale aligns with said line of said longitudinal scale to set said cylindrical scale at zero.

6. The caliper setting device according to claim 4 in which said cylindrical member has an annular base line lying in a plane perpendicular to said axis and longitudinally aligned with said base mark of said longitudinal scale and said indicia of said cylindrical scale are disposed along said base line.

7. The caliper setting device according to claim 4 in which said equally spaced indicia are mutually adjacent.

References Cited in the file of this patent

UNITED STATES PATENTS 2,039,231 Lindner Apr. 28, 1936